United States Patent
Zhang

(10) Patent No.: US 8,082,343 B2
(45) Date of Patent: Dec. 20, 2011

(54) METHOD AND DEVICE FOR MAKING CLIENTS RAPIDLY ACCESS TO THE PEER-TO-PEER NETWORK

(76) Inventor: Yongmin Zhang, Guangdong (CN)

( * ) Notice: Subject to any disclaimer, the term of this patent is extended or adjusted under 35 U.S.C. 154(b) by 317 days.

(21) Appl. No.: 12/297,696

(22) PCT Filed: Apr. 20, 2006

(86) PCT No.: PCT/CN2006/000749
§ 371 (c)(1),
(2), (4) Date: Oct. 20, 2008

(87) PCT Pub. No.: WO2007/121608
PCT Pub. Date: Nov. 1, 2007

(65) Prior Publication Data
US 2009/0070465 A1 Mar. 12, 2009

(51) Int. Cl.
G06F 15/16 (2006.01)
G06F 15/173 (2006.01)
G06F 15/177 (2006.01)

(52) U.S. Cl. .......... 709/224; 709/219; 709/229; 726/15; 715/741

(58) Field of Classification Search .......... 709/217–229; 726/15; 715/741
See application file for complete search history.

(56) References Cited

U.S. PATENT DOCUMENTS

| | | | |
|---|---|---|---|
| 7,437,440 B2 * | 10/2008 | Manion et al. | 709/223 |
| 7,461,130 B1 * | 12/2008 | AbdelAziz et al. | 709/208 |
| 7,558,875 B2 * | 7/2009 | Zhang et al. | 709/238 |
| 2004/0215622 A1 * | 10/2004 | Dubnicki et al. | 707/10 |
| 2005/0021793 A1 * | 1/2005 | Kubsch et al. | 709/229 |
| 2006/0218222 A1 * | 9/2006 | Brahmbhatt et al. | 709/201 |

* cited by examiner

Primary Examiner — Haresh N Patel
(74) Attorney, Agent, or Firm — Global IP Services; Tianhua Gu

(57) ABSTRACT

A method and device for making clients rapidly access to the peer-to-peer network comprise that the accessed clients, which are separated into one or more normal state groups; the clients that intend to log in are separated into one or more login groups; and the required contents, the variant of the contents or the content-related information are selectively transmitted to the members of the login groups immediately. After a certain login group becomes stable, the normal state groups which the login groups intend to be added into are selected and each member of the login groups is added into the selected normal state groups. In this invention, there is no need to frequently send notification individually when each client loges in, rather than send group notification, thus it can reduce network dithering, at the same time the user can receive the content or the related variant of the content immediately and watch the playing of the content without any wait when accessing to the network.

10 Claims, 6 Drawing Sheets

METHOD AND DEVICE FOR MAKING CLIENTS RAPIDLY ACCESS TO THE PEER-TO-PEER NETWORK

FIELD OF THE INVENTION

This invention relates to a computer network, especially to a method and device for making clients rapidly access to the peer-to-peer network.

BACKGROUND

In the peer-to-peer network transmission, there are many clients logging in continuously. The frequent login notifications during the clients' login will result in frequent dithering of network transmission, and affect the users' operation. One of the corresponding solutions is to make login users queue up and wait, and generally, there will be no transmission about the contents during this period.

Moreover, in the existing peer-to-peer network transmission, after the connected clients request transmit the contents, the users can not view the playing of the contents during a period, because it needs to define a certain buffer area at the client side to save the received content package. During this period, some solutions may be made to allow users to rapidly receive the contents or content-related information.

Finally, in order to implement the peer-to-peer network transmission, the nodes will save some relevant information, such as necessary data of communication, which will be generally saved in an information table. For new users, such an information table may have to be transmitted in advance.

SUMMARY OF THE INVENTION

The main purpose of this invention is to provide a method and device for making the client side rapidly access to the peer-to-peer network, so as to reduce the number of the clients login notification and thus reduce network dithering, and allow the user to view the playing of the contents immediately after transmission of the login requirement.

For the purpose above, this invention discloses a method for making the client side rapidly access to the peer-to-peer network, including the following steps:

A1, the connected clients are divided into one or more normal state groups;

B1, the clients intending to connect to the network are divided into one or more login groups;

C1, the required contents, the variant of the contents or the content-related information are selectively transmitted to the members of the login groups immediately;

D1, after a certain login group becomes stable, the normal state groups which said login groups intending to be added into are selected;

E1, the members of the login groups are added into the selected normal state groups, so that they can participate in the transmission of the normal peer-to-peer network.

In this description, 'a group' means a group of nodes.

The effect of the content transmission in step C1 is different from that of content transmission in the normal state groups. In the content transmission of the normal state groups, less network bandwidth is used to support a large number of users, and the quality of service is mainly concerned; in the content transmission in step C1, it doesn't support such a large number of users even using the peer-to-peer network transmission, and it provides no or only few Quality of Service in order to implement rapid response.

In step B1, a client that intends to log in is added into a login group with the same attributes. If there is no such a login group, a new login group with the same attributes will be created, into which the said client will be added. If the said login group can't be created, a login group with other attributes will be sought instead, or return to error result.

In step D1, whether a login group is stable is determined through the following steps:

D11, the number of the members in the login group is detected;

D12, whether the number of the members in a login group is larger than or equal to a predetermined value is determined. If yes, the said login group can be regarded as stable; if not, the step D13 will be executed.

D13, determining whether the time when the login group waits to be added into the normal state group is longer than or equal to the first predetermined time. If yes, the said login group can be regarded as stable; if not, continues to wait.

Wherein, in step D1 the normal state group into which the login group intends to be added is selected through the following steps:

Selecting the normal state group with the same attributes;

If the said normal state group exists, determines whether the number of the members in a login group is less than the predetermined value. If yes, the normal state group with fewer members is selected as one that the login group intends to be added into in order to keep the system in balance. If there is no normal state group whose number of members is less than the predetermined value, another group with the same attribute is added as the normal state group which the login group intends to add into;

If there is no normal state group with the same attributes, a new such normal state group is created as the normal state group which the login group intends to be added into.

Moreover, the number of the normal state groups requiring transmission operation is minimized to reduce the demand for network bandwidth. More specifically, two or more normal state groups are merged if the number of groups should be reduced and such a reduction is possible.

For conveniently managing the clients, the following steps are also included: for each normal state group, a normal state control dataset is established, which records the attributes of each member in the group, and which at least comprises the necessary data for mutual communication among each member and marks reflecting changes of this control dataset; for each login group, a login control dataset is also established, which records the attributes of each member in the group, and which at least comprises the necessary data for mutual communication among each member and marks reflecting changes of this control dataset.

In this description, the control dataset can be a table comprising a set of information about users, with data about communication and state data of each client, or with data about control scheduling.

After step B1, the login group continuously receives new members, and reflects the reception on the data control set, which means recording new members into the set.

In step E1, the normal state control dataset of the selected normal state group is transmitted to the said login group.

The method further includes the following steps after step E1:

F1, the normal state control dataset of the selected normal state group is updated;

H1, the updated normal state control dataset is transmitted to all members of the said normal state group.

To update the control dataset, the following steps for maintaining the control dataset are also included:

A2, the server monitors the connection requirement, the disconnection requirement and the communication status of the clients that participate in content transmission, reflects the changes in the control datasets, and marks the changed control dataset.

B2, the updated control dataset is transmitted to each client through the following steps:

B21, depending on the existing control dataset, the server divides the changed parts of the control dataset or the variant of the control dataset into blocks, then respectively transmits the blocks to part or all members; the said members will in turn transmit the blocks received from the server to other members in the group.

B22, if previous control datasets are unavailable for the members, the whole control dataset or its variant will be transmitted by the server to the said members.

In step C1, P2P transmission can be used in transmission of contents, the variant of contents or the content-related information to the login groups by the server, including the following steps: the contents, the variant of the contents or the content-related information to be transmitted are divided into blocks, which then are respectively transmitted to part or all members in the login groups; the said members will in turn transmit the blocks received from the server to other members in the group.

The said variant of the contents is based on a certain format.

The further improvement of this invention lies in that after being stable, the login group is changed to the transitional groups as a whole in step D1.

After transmitting the control dataset of the selected normal state group to the members of the group or when the time is longer than a second predetermined time, the said transitional groups are added into the selected normal state groups as a whole.

For the above purposes, this invention also relates to a device for making clients rapidly access to the peer-to-peer network, comprising: a login processing module for establishing one or more login groups for the clients intending to log in; a transmission module for transmitting the required contents, the variant of the contents or the content-related information to the clients; a login group detection module for detecting the stability of the login groups and outputting a notification of stability when a login group becomes stable; a selection module for selecting the normal state groups that the login group intends to be added into after receiving the stability notification of this login group; and a normal state group processing module for creating one or more normal state groups for the login clients, and adding each member of stable login groups into the selected normal state groups.

For the above purposes, this invention also relates to a computer readable medium containing computer executable programs, which can be executed to perform the followings:

the login clients are divided into one or more normal state groups;

the clients intending to log in are divided into one or more login groups;

the required contents, the variant of the contents or the content-related information are selectively transmitted to members in login groups immediately;

after one login group becomes stable, the normal state groups which the login groups intend to be added into are selected;

each member of the login groups is added into the selected normal state groups.

For the above purposes, this invention also relates to an computer executable program used in a server. The said program can be executed to perform the followings:

the login clients are divided into one or more normal state groups;

the clients intending to log in are divided into one or more login groups;

the needed contents, the variant of the contents or the content-related information are selectively transmitted to members in login groups immediately;

after one login group becomes stable, the normal state groups which the login groups intend to be added into are selected;

each member of the login groups is added into the selected normal state groups.

The advantages of this invention include: 1) there is no need to frequently send notification individually when each client loges in; rather, notifications are sent in groups, and thus network dithering is reduced. 2) The control dataset is transmitted as a whole in advance in order to facilitate the subsequent transmission of the changed parts in the control datasets only for updating. 3) Users can immediately receive the content or content-related variant (fragments or abstracts), and view the playing of the contents without any wait.

The characteristics and advantages of this invention will be illustrated in detail with reference to the embodiments and accompanying figures.

EMBODIMENTS OF THE INVENTION

Figure 1:
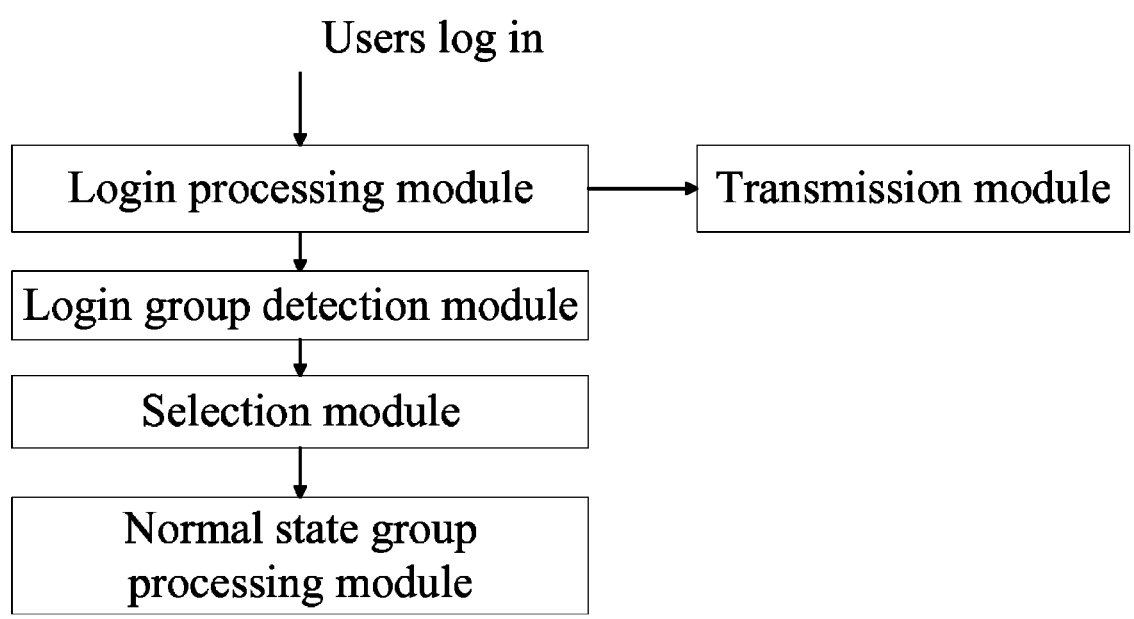
FIG. 1 is a structured block diagram of an embodiment according to this invention.

As shown in FIG. 1, a normal state group processing module on the server creates one or more normal state groups for the accessed (logged in) clients The login processing module creates one or more login groups for the clients that intend to log in; the login group detection module detects the stability of the login groups, and outputs the notifications of stability of the login group when one of them becomes stable; the selection module selects the normal state groups that the login group intends to be added into after receiving the stability notification of this login group; the normal state group processing module adds each member of stable login groups into the selected normal state groups; the transmission module selectively transmits the required contents, the variant of the contents or the content-related information to the members of the login groups immediately, and also transmits the required contents to the members in the normal state groups.

The control dataset establishing and maintaining module and the control dataset transmission module can also be further included. The control dataset establishing and maintaining module establishes a control dataset for each normal state group to record the attributes of each client in the group, and also establishes a control dataset for each login group to record the attributes of each client in the group. The control datasets at least include the necessary data for mutual communication among each member and marks that reflect changes of this control dataset; each control dataset is transmitted to the corresponding group through the control dataset transmission module.

Figure 2:
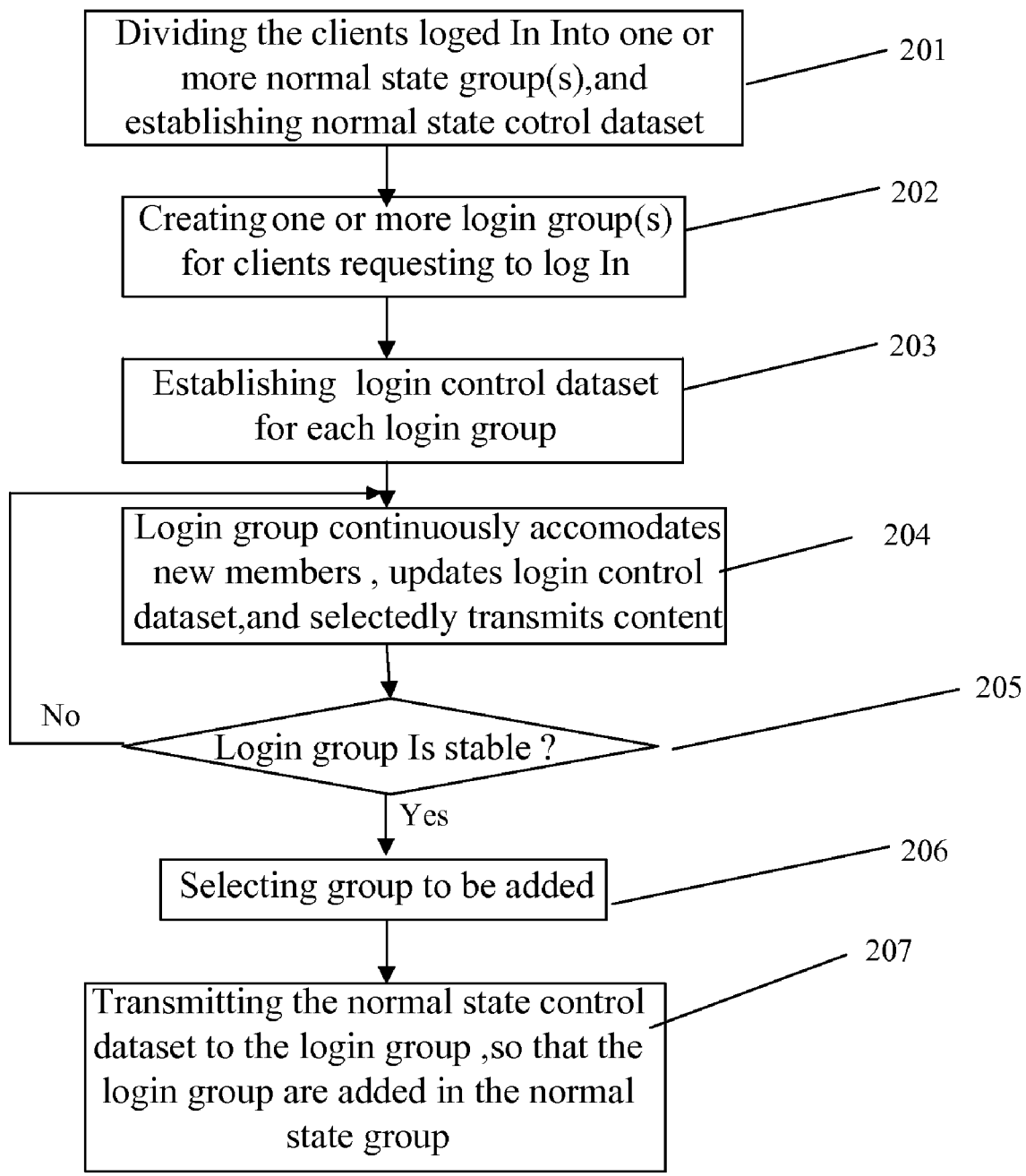
FIG. 2 is a flowchart of an embodiment of this invention.

As shown in FIG. 2, the flow includes the following steps:

In step 201, one or more normal state groups are created for the accessed (logged in) clients, and the control dataset for recording the attributes of each member in the group is established for each normal state group. The control datasets at least include the necessary data for mutual communication among each member and marks that reflect changes of this control dataset. Then step 202 is executed;

In step 202, one or more login groups are created for the clients intending to log in. The login groups can be one or more, and may be empty groups if there are no clients logging in at some time. Then step 203 is executed;

In step 203, the control datasets for recording the attributes of each member in the group are established for each login group. The control datasets at least include the necessary data for mutual communication among each member and marks that reflect changes of this control dataset. Then step 204 is executed;

In step 204, the login group continuously accommodates new members. When a new client requests to log in, it is added to a login group with the same attributes. If there is no such a login group, a new login group with the same attributes is created, and the said client is added into the newly created group. The control datasets need to be updated after the new login clients are added in to the login groups, and the updated control datasets are transmitted to the said login groups selectively by the server. During this process, the server can selectively transmit the required contents, the variant of the contents, or the content-related information to the members in the login groups immediately. P2P transmission can be used in the transmission, including the following steps: the contents, the variant of the contents, or the content-related information to be transmitted are divided into blocks, which are then respectively transmitted to part or all members; the said members will in turn transmit the received blocks from the server to other members in the group. During the time when the server transmits data to the login groups, the step 205 is executed constantly;

In step 205, whether the login groups are stable is determined through the following steps:

1) The number of the members in the login group is detected;

2) Whether the number of the members in a login group is larger than or equal to a predetermined value is determined. If yes, the said login group can be regarded as stable; if not, step 3) will be executed.

3) Whether the time when the login group waits to be added into the normal state group is longer than or equal to the first predetermined time is determined. If yes, the said login group can be regarded as stable. After a login group becomes stable, step 206 will be executed. If there is no stable login group, return to execute step 204.

In step 206, the normal state group which the said login group intends to be added into is selected according to the following rules: the number of the normal state group with transmission activities is minimized to reduce the demand for network bandwidth; the normal state group with fewer members is selected from the normal state groups with transmission activities for keeping system in balance.

The detailed steps are as follows:

1) the normal state groups with the same attributes are selected to add into. If such groups are available, step 2) is executed; if not, step 3) is executed;

2) whether the number of the members in a login group is less than or equal to a predetermined value is determined. If yes, the normal state group with fewer members is selected to add into. If there is no normal state groups whose number of members is less than or equal to the predetermined value, the step 3) is executed;

3) a normal state group with the same attributes is created. Then step 207 is executed;

In step 207, the control dataset of the said normal state group is transmitted to the members in the said login group, and then is transmitted to other members in the login group who require it by those who have already received it according to the control dataset of the group, so that all members in the said login group have the control dataset of the normal state group that they intend to be added into. Then step 208 is executed;

In step 208, each member in the said login group is added into the selected normal state group.

After each member in the login group is added into the selected normal state group, the server updates the control dataset of the said normal state group, transmits the updated control dataset to the said normal state group, and finally makes all members in the normal state group have the updated control dataset.

Moreover, the step of dividing the accessed (logged in) clients into one or more normal state groups can be placed after the step of dividing the clients intending to log in into one or more login groups.

Figure 3:
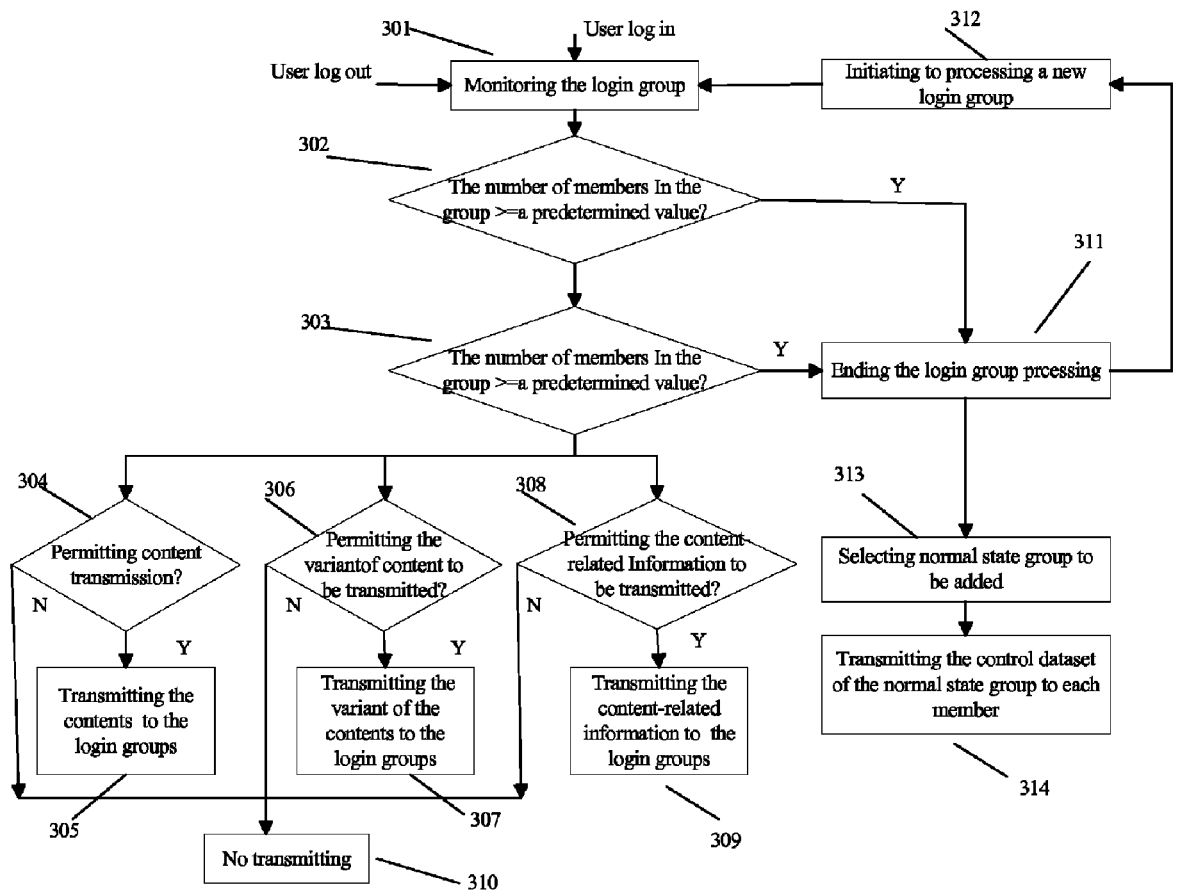
FIG. 3 is a detailed flowchart of the login group processing of an embodiment according to this invention.

In FIG. 3 the flowchart about the login group processing is shown, including the following steps:

In step 301, the number of the members in the login group is detected according to the user's login and logout. Then step 302 is executed;

In step 302, whether the number of the members in a login group is larger than or equal to a predetermined value is determined. If not, step 303 is executed; if yes, step 311 is executed;

In step 303, whether the time when the login group is waiting to be added into the normal state group (also the time for creating the login group) is longer than or equal to t1, the first predetermined time, is determined. If yes, the step 311 is executed; if not, the step 304, 306, 308 are executed;

In step 304, whether to allow the contents to be transmitted is determined, according to the setting of the system, contents, or the client. If yes, the step 305 is executed; if not, the step 310 is executed;

In step 305, the contents are transmitted to the login groups by the server;

In step 306, whether to allow the variant of the contents to be transmitted is determined, according to the setting of the system, contents, or the client. If yes, the step 307 is executed; if not, the step 310 is executed;

In step 307, the variant of the contents is transmitted to the login groups by the server;

In step 308, whether to allow the content-related information to be transmitted is determined, according to the setting of the system, contents, or the client. If yes, the step 309 is executed; if not, the step 310 is executed;

In step 309, the content-related information is transmitted to the login groups by the server;

In step 310, the contents, the variant of the contents or the content-related information are transmitted to the login groups by the server;

In step 311, the processing of the said login group is ended. Then step 312 and 313 are executed;

In step 312, starts to process a new login group, and then step 301 is executed again;

In step 313, the normal state group to be added into is selected, and then the step 314;

In step 314, P2P transmission can be used in transmission of the control dataset of the selected normal state group to the login group. For example, the control dataset is divided into blocks, which are transmitted to part or all members in the login groups, and then are transmitted to other members in the login group who have not received it by those who have already received it according to the control dataset of the group.

Figure 4:
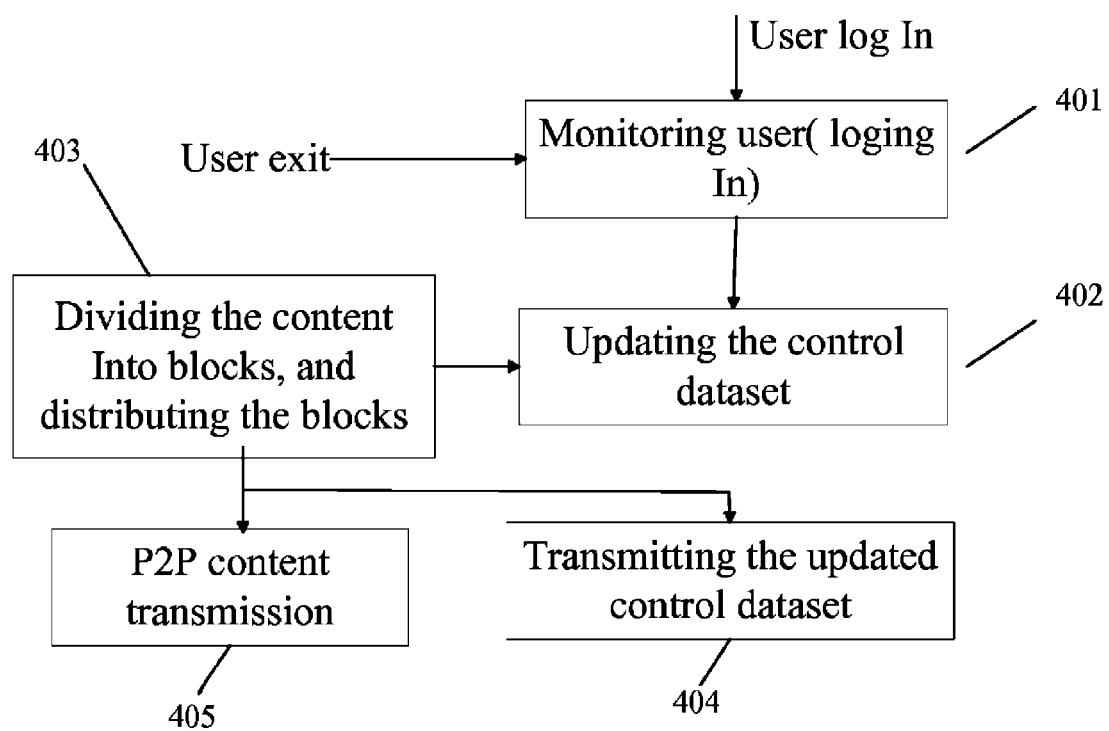
FIG. 4 is a detailed flowchart of the normal state group processing of an embodiment according to this invention.

As shown in FIG. 4, the flowchart of the normal state group processing includes the following steps:

In step 401, monitors if there are some clients added into or removed from the said normal state group. When any change occurs, the step 402 is executed;

In step 402, the control dataset of the normal state group is updated, and then the step 403 is executed;

In step 403, the control dataset or the changed part of it is divided into blocks, and then the blocks is transmitted to all members in the said normal state group in step 404, which is controlled through content block distribution scheduling and transmission scheduling, in order to update the control dataset.

Moreover, step 403 can be used in dividing the contents into blocks and controlling P2P content transmission in step 405, through content block distribution scheduling and transmission scheduling.

Figure 5:
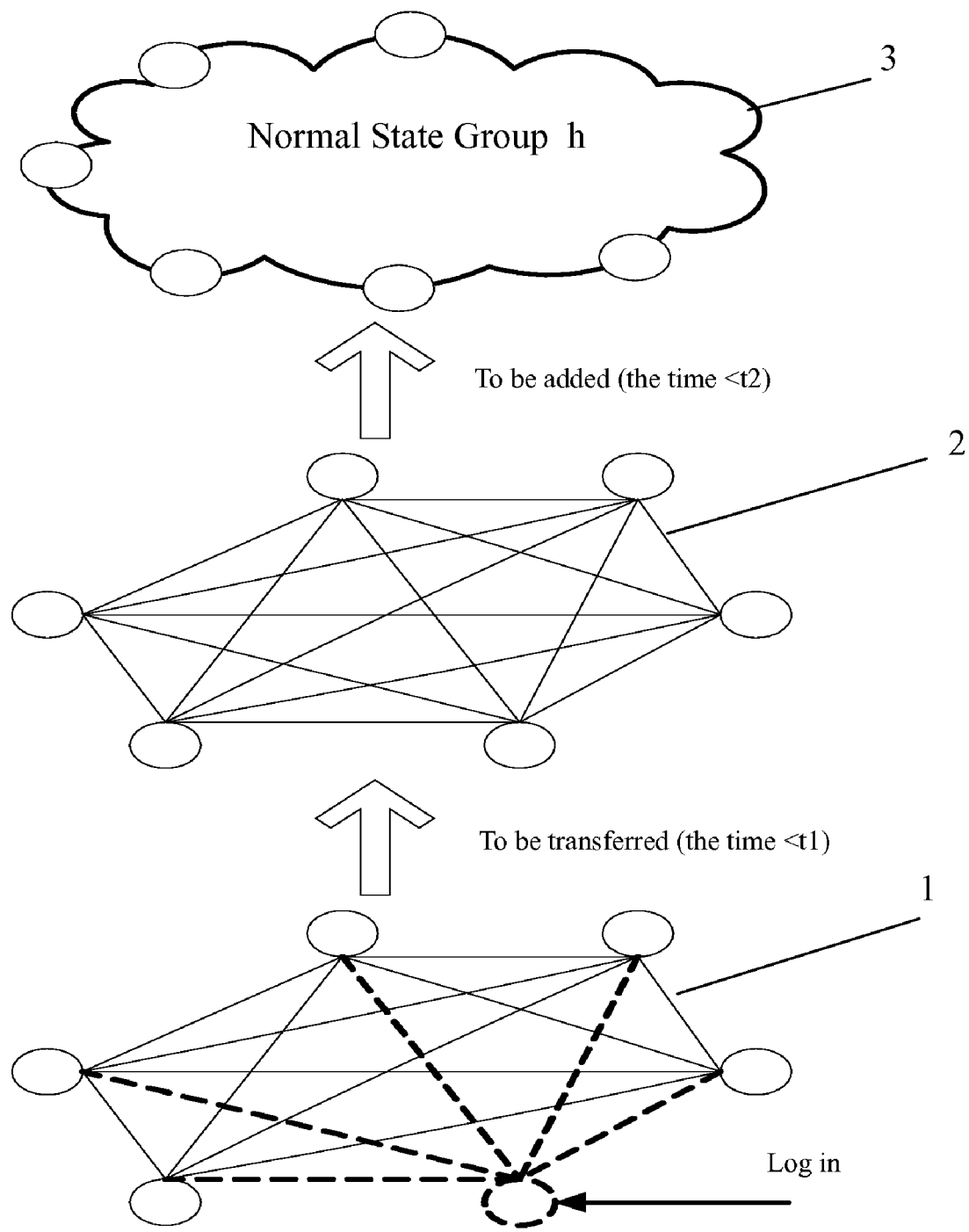
FIG. 5 is one of the schematic diagrams of the login groups being added into the normal state groups of an embodiment according to this invention.
Figure 6:
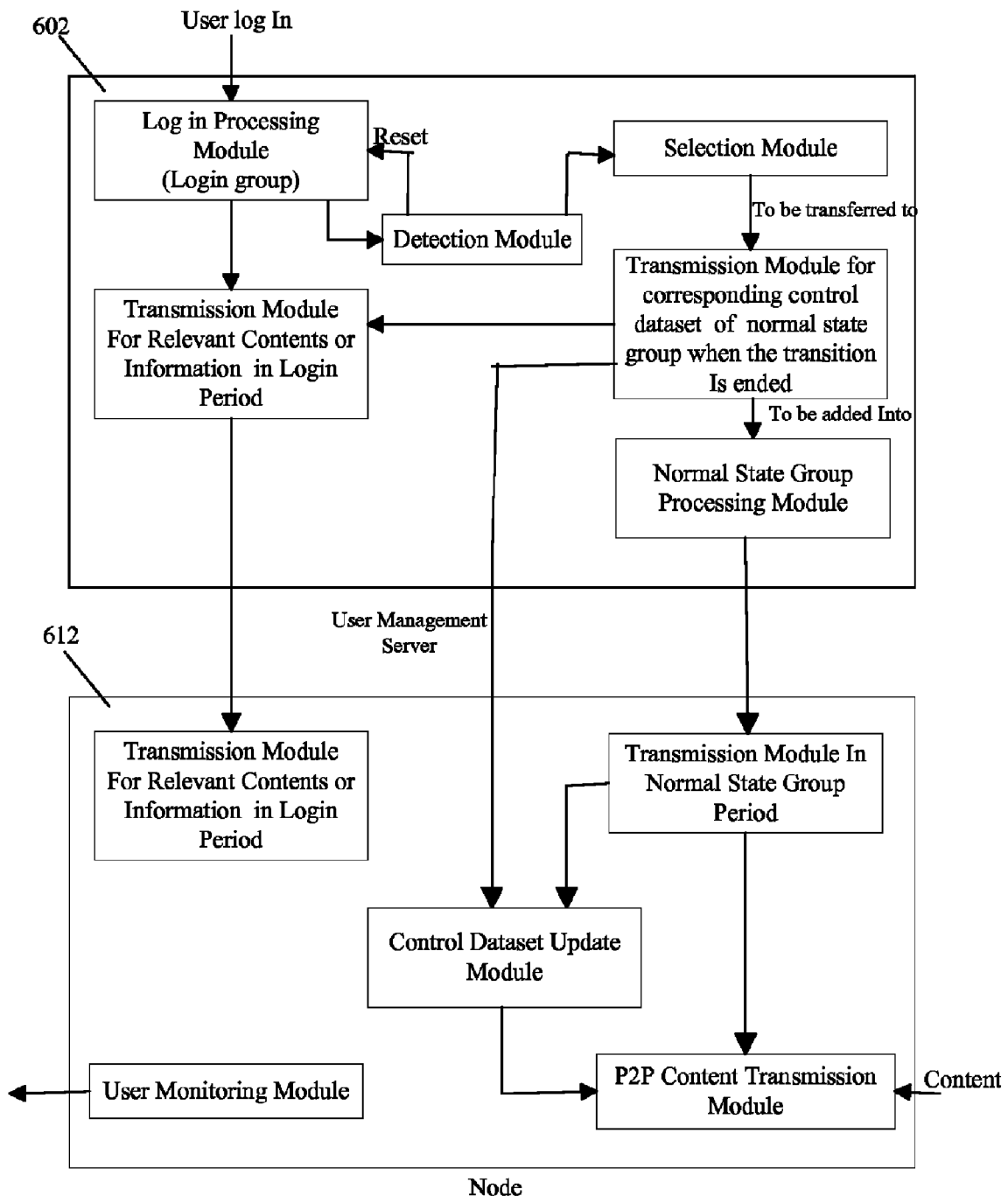
FIG. 6 is a structured diagram of another embodiment according to this invention.

After being stable, the login group can be transferred to the transitional group as a whole as shown in FIG. 5. That is, after the login group becomes stable, after t1 (the first predetermined time) for example, the login group1 is transferred to the transition group2 as a whole. The transition group is a form of the login group after being stable and before being added into the normal state group, and also can be regarded as the login group in the final phase, one of whose specific functions is to transmit the control dataset to be added into the normal state group to all members in the transition group. After finished the transmission of the control dataset of the selected normal state group to all members, or after t2, the second predetermined time, the transitional group is added into the selected normal state group3 as a whole. If there are no normal state groups, the transitional group is transferred to the normal state group directly. As shown in FIG. 6 is the structure figure shows that the login group is added into the normal state group through the transition group and the transmission at various states. The schematic diagram of the server side is shown in 602 above, and the schematic diagram of the client side is shown in 612 below. On the server side, the login processing module adds the login user into a proper login group or creates a new login group, and then the login group detection module detects the stability of the login group, and outputs the notification of stability when a login group becomes stable. This time period when the above operation is performed is called the login period. The selection module selects the normal state groups that the login group intends to be added into after receiving the stability notification of this login group; the control dataset transmission module transmits the control dataset of the selected normal state group to all members in the said login group, this time period that performing these operations needs to spend is also called transitional period. The normal state group processing module adds each member of the said login group into the selected normal state groups, which is called the normal state group period; The transmission module is separated into the transmission module for the contents or information in login period and the transmission module in the normal state group period. On the client side, the transmission module for relevant contents or information in login period selectively transmits the required contents, the variant of the contents or the content-related information to the members in the login group immediately; the transmission module in the normal state group period transmits the required contents to the members in the normal state group; the control date set updating module updates the control dataset; the P2P content transmission module transmits the existing contents to other clients by blocks, according to the updated control dataset and the content transmitted by the transmission module in the normal state group period.

During transmission, the control dataset is maintained through the following steps:

1) The server monitors the connection and disconnection requirement and the communication status of the clients that participate in content transmission, makes changes reflected in the control datasets, and marks the changed control dataset.

2) The updated control dataset is transmitted to each client.

The updated control dataset makes the control dataset of the clients be updated through the following preferred steps:

1) depending on the existing control dataset, the server divides the change d parts of the control dataset or the variant of the control dataset into blocks, then respectively transmits the blocks to part or all members; the said members will transmit the received blocks from the server to other members in the group again.

2) If there is no previous control dataset for the members, the whole control dataset or its variant will be transmitted by the server to the said members.

The module and flow mentioned above can be implemented to programs, which can be installed in the computer, including the server computer.

The programs implemented according to the module and flow mentioned above can be stored in external readable storage medium, such as the floppy disk, CD-ROM, the hard disk, the magnetic tape recording medium, semiconductor memory of IC cards or other optical recording medium (DVD or PD, for example) or magnetic recording medium. The server system providing the network connection can also be the readable medium for recording programs. The medium also include electrical, optical, acoustical or other forms of communication signals (for example, the carrier wave, infrared signals, digital signals, etc.)

What is claimed is:

1. A method for making clients rapidly access to a peer-to-peer network by grouping clients for entering comprising the following steps:

A1, establishing, by a hardware processor, one or more normal state groups for accessed (logged in) clients;

B1, establishing, by a hardware processor, one or more login groups for clients that intend to log in;

C1, selectively transmitting, by a hardware processor, required contents, variant of the contents or content-related information to the members of the login groups immediately;

D1, selecting, by a hardware processor, after a certain logging group becomes stable, the normal state groups which the login groups intend to add into;

in the step D1 whether the login group is stable is determined through the following steps:

D11, the number of the members in the login group is detected,

D12, whether the number of the members in a login group is larger than or equal to the predetermined value is determined, if yes, the login group can be regarded as stable, if not, a step D13 is executed, D13, whether the time during which the login group waits to be added into the normal state group is longer than or equal to a first predetermined time is determined, if yes, the login group can be regarded as stable; if not, the process continues to wait;

the normal state group which the login group intends to be added into is selected in step D1 through the following steps:

the normal state group with the same attributes is selected, if there exists the normal state group, determining whether the number of the members in a login group is less than a predetermined value; if yes, the normal state group with fewer members is selected as one that the login group intends to be added into for system balance, if there is no normal state groups whose number of members is less than a predetermined value, another group with the same attribute is added as the normal state group which the login group intending to be added into, if there is no normal state group with the same attributes, a new such normal state group is created as the normal state group which the login group intends to be added into;

for both each normal state group and each login group, control datasets are established, which record the attributes of each member in the state and login groups, and at least comprise necessary data for mutual communication among each member and marks of reflecting changes of the control dataset; and E1, adding, by a hardware processor, each member of the login groups into the selected normal state groups.

2. The method according to claim 1, wherein in the step B1, the client that intends to log in is added into the login group with the same attributes; if there is no such a login group, a new login group with the same attributes will be created and the said client will be added into the newly created group with the same attributes.

3. The method according to claim 1, wherein the login group continuously receives new members, and makes reflection on the control dataset after the step B1.

4. The method according to claim 3, wherein a normal state control dataset of the selected normal state group is transmitted to the login group in the step E1.

5. The method according to claim 4, wherein comprising the following steps after step E1:

F1, the normal state control dataset of the selected normal state group is updated; and H1, the updated normal state control dataset is transmitted to all members of the normal state group.

6. The method according to claim 1, wherein the steps for maintaining the control dataset:

A2, a server monitors connection and disconnection requirements and communication statuses of the clients that participate in content transmissions, makes changes reflected in the control datasets, and marks the changed control dataset; and B2, the updated control dataset is transmitted to each client through the following steps:

B21, depending on the existing control dataset, the server divides changed parts of the control dataset or the variant of the control dataset into blocks, then respectively transmits the blocks to part or all members; the members transmit the received blocks from the server to other members in the same group again; and B22, if there is no previous control dataset for members, the whole control dataset or its variant will be transmitted by the server to members.

7. The method according to claim 1, wherein a P2P transmission can be used in transmission of contents, variant of contents or content-related information to the login groups by a server in step C1, through the following steps: the contents, the variant of the contents or the content-related information to be transmitted are divided into blocks, which then are respectively transmitted to part or all members in the login groups; the members will transmit the received blocks from the server to other members in the same group again.

8. The method according to claim 4, wherein after being stable, the login group is transferred to a transition group as a whole in step D1.

9. The method according to claim 8, wherein after the transmission of the control dataset of the selected normal state group to all members is finished, or after a second predetermined time, the transitional group is added into the selected normal state group as a whole.

10. A device for making clients rapidly access to peer-to-peer network comprising:

means for establishing one or more normal state groups for accessed (logged in) clients;

means for establishing one or more login groups for the clients that intend to log in;

means for selectively transmitting required contents, variant of the contents or content-related information to the members of the login groups immediately;

means for selecting, after a certain logging group becomes stable, the normal state groups which the login groups intend to add into;

means for adding each member of the login groups into the selected normal state groups; and means establishing control datasets which record the attributes of each member in the state and login groups, and at least comprise necessary data for mutual communication among each member and marks of reflecting changes of the control dataset for both of each normal state group and each login group.

* * * * *